United States Patent [19] [11] 4,096,229
Maivar [45] Jun. 20, 1978

[54] METHOD OF MAKING A MOLDED ARTICLE WITH A TEXTURED SURFACE
[75] Inventor: Yossef Maivar, Stirling, N.J.
[73] Assignee: Glasflex Corporation, Stirling, N.J.
[21] Appl. No.: 610,287
[22] Filed: Sep. 4, 1975
[51] Int. Cl.² .................... B29C 5/00; B29D 23/08
[52] U.S. Cl. .................... 264/316; 264/338; 264/342 R
[58] Field of Search ............... 264/230, 316, 331, 342, 264/338, 347, DIG. 71, 73, 291, 342 R, 313, 359, 77

[56] References Cited
U.S. PATENT DOCUMENTS

| 1,937,396 | 11/1933 | Watkins | 264/261 |
|---|---|---|---|
| 2,328,525 | 8/1943 | Egloff | 264/337 |
| 2,559,345 | 7/1951 | Church et al. | 264/331 |
| 2,613,397 | 10/1952 | Borkland | 264/316 |
| 3,126,680 | 3/1964 | Baird et al. | 264/230 |
| 3,152,380 | 10/1964 | Martin | 264/342 R |
| 3,306,956 | 2/1967 | Barnette | 264/1 |
| 3,394,211 | 7/1968 | MacDuff | 264/230 |
| 3,468,977 | 9/1969 | Bruckman et al. | 264/16 |
| 3,515,619 | 6/1970 | Barnette | 264/316 |
| 3,600,490 | 8/1971 | Billingsley et al. | 264/171 |
| 3,823,023 | 7/1974 | Duggins et al. | 264/338 |
| 3,993,813 | 11/1976 | Grieco et al. | 264/158 |

OTHER PUBLICATIONS
Randolph et al., Plastics Engineering Handbook, Reinhold, N.Y. (1960), pp. 287–291.

Primary Examiner—Willard E. Hoag
Attorney, Agent, or Firm—Pennie & Edmonds

[57] ABSTRACT

In a method for forming castings made from a polymerizable hydrophobic monomeric material wherein a liquid hydrophobic polymerizable plastic monomer material is pumped into a cavity, which is defined by a pair of spaced apart smooth surfaced plates that are sealed about the outer perimeter, and polymerized therein to a solid, self-supporting casting, the improvement comprising the preliminary step of applying the relatively thin thermoplastic sheet across at least a portion of at least one of the spaced apart smooth surfaces, said thermoplastic sheet stretching when in contact with the liquid polymerizable monomer material during polymerization of said material and during cooling of said polymerized material, the sheet shrinking and distorting in random fashion so as to produce a randomly textured surface on at least the corresponding adjacent portion of the polymerized casting.

5 Claims, 4 Drawing Figures

METHOD OF MAKING A MOLDED ARTICLE WITH A TEXTURED SURFACE

BACKGROUND OF THE INVENTION

1. Field of the Invention

This invention is generally directed to the formation of molded sheets, panels, or the like having a textured surface. More particularly, the present invention relates to a novel and improved method of forming plastic castings or the like made of a suitable polymerizable hydrophobic monomeric material having a randomly textured surface.

2. Description of the Prior Art

In the field of casting polymerizable materials, it is generally known to provide at least one surface of the cast material with a textured surface. In many situations, this is primarily performed for purposes of enhancing the ornamental characteristics of a molded piece of material, as well as improving light diffusing properties of certain materials, such as those made from acrylic resins.

Several rather well-known techniques exist in the art for providing cast materials with textured surfaces. Generally speaking, the earlier attempts for obtaining such a surface were achieved by etching, embossing, blasting and the like. Later, other attempts contemplated pre-embossed polyester films, such as taught in U.S. Pat. No. 3,072,973. These latter prior art methods, as with the type indicated above, suffer, however, from the common disadvantage of being relatively complicated and expensive procedures.

Another heretofore known approach, disclosed in U.S. Pat. No. 3,306,956, essentially aims at producing decorative cured resin panels and the like through a single casting or pouring step. In this patent, however, a thin sheet of film is mechanically creased prior to molding so as to provide a multiplicity of elevated and depressed parts in the finished casting. Such mechanical creasing of the film is usually accomplished by crumpling, crushing, squeezing, and drawing the film. The particular disadvantage associated with the foregoing described method, is that the textured surface must be produced by a mechanically pre-formed and pre-distorted pattern sheet or film. Although this process provides an improvement over conventional procedures, it nonetheless is not altogether satisfactory from the standpoint that it requires the additional step of mechanically pre-forming the film to achieve a desired surface having a multiple, irregular and random pattern. This additional step, in general, also undesirably results in a textured casting which is relatively expensive to produce.

It should be emphasized that the particular field of casting panel members or the like having a textured surface is extremely competitive, and there is a small profit margin associated with the production of these textured panels. As a consequence thereof, it will be appreciated that even slight increases in costs may render such panels commercially less desirable from a cost standpoint than the competing materials.

Further known methods for producing a textured surface during a single step casting step are generally disclosed in U.S. Pat. Nos. 2,288,559 and 3,269,886. As described in the latter patent, a cementitious material which is to be molded incorporates water which reacts with the cementitous mass to set the same and also reacts upon a film of material so as to cause the film to swell at the same time the cementitious material is brought into contact with the film. A major disadvantage associated with this particular casting method is that it depends upon a swelling operation resulting from water absorption to produce the non-uniform surface pattern. Consequently, such teachings would be unsuitable for casting non-uniform patterns in hydrophobic materials, such as, for instance plastics.

In connection with the earlier referenced U.S. Pat. No. 2,288,559, a wax paper film of material is described as being inserted in the mold so as to serve to distort the fluid mass of material during hardening. As with the previously mentioned prior art technique disclosed in the above patent, this particular patent similarly suffers the shortcoming of being limited to those situations wherein hydrophilic masonry or concrete type materials are employed. It would not be suitable to provide for the formation of a random textured surface for hydrophobic materials, such as a polymerizable acrylic monomer. Similarly, the process defined in U.S. Pat. No. 1,588,728 is subject to the disadvantage that it is primarily intended for use in conjunction with hydrophilic materials. Accordingly, it could not be effectively used with hydrophobic materials.

As can be appreciated from the foregoing comments directed to the typical shortcomings associated with the formation of cast materials having textured or patterned surfaces, none have, in general, been able to successfully achieve in a simple, reliable, and economical manner the production of randomly textured surfaces on finished cast members made from a hydrophobic material, such as polymerizable acrylic monomers by using a thin shrinkable plastic sheet, such as polyethylene.

SUMMARY OF THE INVENTION

Accordingly, it is an object of the present invention to overcome the disadvantages associated with the heretofore known prior art techniques for producing randomly textured surfaces in cast materials especially in connection with hydrophobic polymerizable monomer materials.

Briefly, the present invention is directed to an improvement for the method for forming castings made from a polymerizable hydrophobic monomeric material wherein a liquid hydrophobic polymerizable plastic monomer material is pumped into a cavity, which is defined by a pair of spaced apart smooth surfaced plates that are sealed about the outer perimeter, and polymerized therein to a solid, self-supporting casting, the improvement comprising the preliminary step of applying a relatively thin thermoplastic sheet across at least a portion of at least one of the spaced apart smooth surfaces, said thermoplastic sheet stretching when in contact with the liquid polymerizable monomer material during polymerization of said material and during cooling of said polymerized material, the sheet shrinking and distorting in random fashion so as to produce a randomly textured surface on at least the corresponding adjacent portion of the polymerized casting.

BRIEF DESCRIPTION OF THE DRAWINGS

The above, as well as other objects, features, and advantages of the present invention will become apparent upon a reading of a detailed description thereof when viewed in conjunction with the accompanying drawing wherein like reference numerals indicate like structure throughout the several views.

DETAILED DESCRIPTION

Referring to FIGS. 1 to 4, the sequence of operations performed in the forming of cast polymerized monomer sheets or panels 10, having at least one randomly textured surface 12 with a multiplicity of projections and depressions will be more clearly understood. For the sake of clarity, however, in describing the present invention, it will be appreciated that any conventional form of molding assembly which is typically utilized in the formation of flat acrylic panels and the like may be used in conjunction with this invention. Additionally, of course, other suitable types of mold assemblies may be used.

Figure 2:
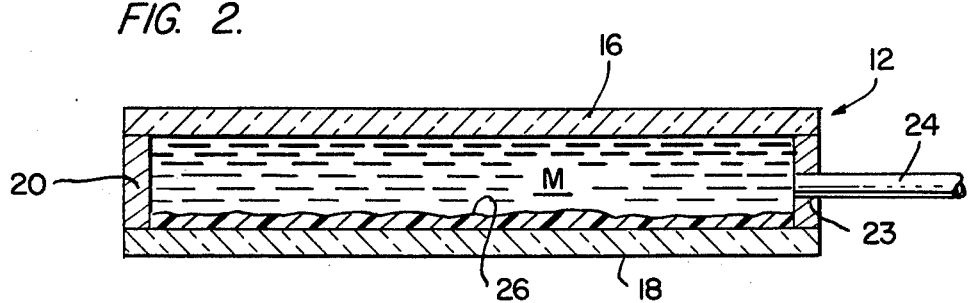
FIG. 2 is a diagrammatic view illustrating a polymerizable type of hydrophobic monomeric material being injected into a closed mold cavity which houses the thin strip of plastic material.
Figure 3:
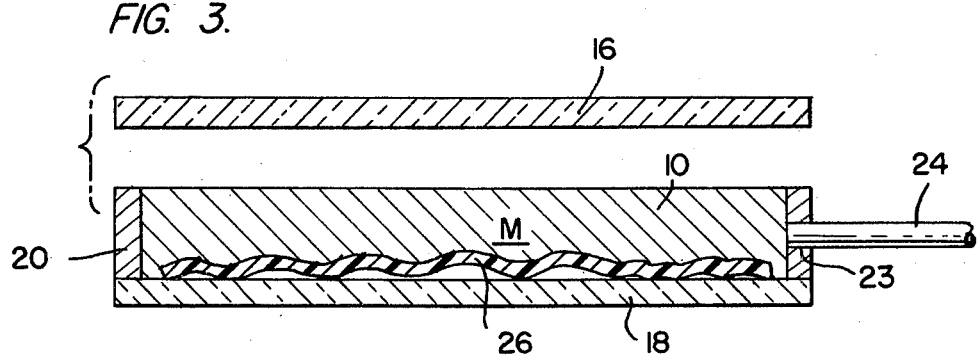
FIG. 3 is a diagrammatic view illustrating a randomly distorted thermoplastic sheet and the correspondingly textured surface of the finished solid polymerized material.

As depicted in FIG. 2, there is diagrammatically shown a standard molding assembly being generally indicated by reference numeral 14. It will be understood that the components forming the molding assembly 14 are made of conventional materials, and are constructed and assembled in a known fashion. In the present embodiment, the molding assembly 14 includes a pair of generally spaced apart and parallel upper and lower glass plates 16 and 18, respectively. Each of the glass plates 16 and 18 are appropriately formed so as to have continuously smooth surfaces. It will, of course, be recognized that the plates 16 and 18 may assume any convenient configuration such as generally rectangular. Such monomers are acrylic acid, methacrylic acid, esters of these acids and acrylonitrile, with the acrylic acid being preferred.

Additionally, molding assembly 14 includes a conventional gasket seal means 20 which, in a known manner, maintains the glass plates 16 and 18 in a generally spaced apart and parallel position. Also, seal means 20 defines the outer perimeter of the correspondingly formed mold cavity 22. The gasket seal means 20 further defines an opening 23 which cooperates with a suitable material supply line 24.

Supply line 24 is connected to a suitable source (not shown) of polymerizable monomeric material M and serves the purpose of injecting such material M into the mold cavity 22 for enabling the formation of the flat panel 10. The material which is contemplated for use in the present invention is a polymerizable hydrophobic monomer. The description, hereinafter set forth, is directed to the casting of polymerizable panels 10 made from the preferred materials; polymerizable hydrophobic monomers and comonomers used to make acrylic resins. Such monomers are acrylic acid, methacrylic acid, esters of these acids and acrylonitrile, with the acrylic acid being preferred. As used herein, the term "polymerizable hydrophobic monomeric material" means the liquid mixture of the monomers or comonomers together with any necessary catalysts, plasticizers, chain-length regulators, coloring materials, and the like conventionally used in polymerization. It should be pointed out, moreover, that other conventional thermoplastic or thermosetting polymerizable monomers which are hydrophobic, may be employed without departing from the spirit and scope of this invention. It is also within the scope of the instant invention to use a mixture of different known hydrophobic monomers which can then be copolymerized. The polymerization conditions used, such as catalysts, temperature, pressure, and the like, are those conventionally used to polymerize the particular monomer or comonomers in the polymerizable monomeric material. As such, they are well-known to those skilled in this art and further elaboration is not deemed necessary.

Figure 1:
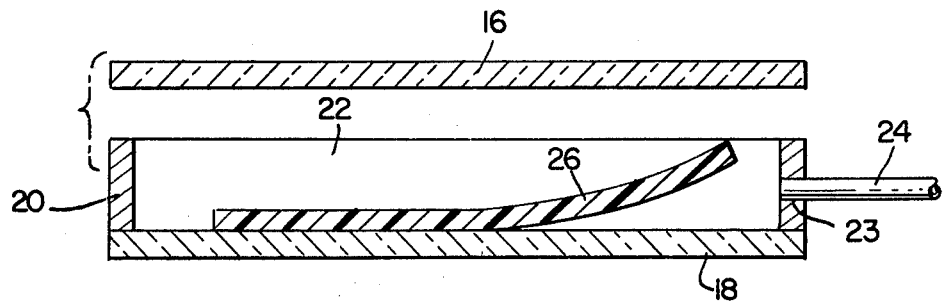
FIG. 1 is a diagrammatic view illustrating a thin thermoplastic sheet being applied to a mold cavity.

As more clearly shown in FIG. 1, a thin sheet 26 of a thermoplastic material has been suitably placed upon at least a portion of the smooth surface of the lower glass plate 18 for purposes presently described. In this embodiment, such sheet 26 may be fabricated from a polyethylene material. It will be readily appreciated that the polyethylene sheet 26 may also be applied to the upper plate 14. Essentially, the polyethylene sheet 26 functions to produce the randomly textured surface 12 in the finished cast acrylic panel 10 in a manner to be presently set forth. Polyethylene is the desired resin because it will withstand the usual polymerization temperatures of the monomers without dissolving from the heat or chemical reactions incident to the polymerization. In addition, the polyethylene sheet 26 stretches as a result of the heat used during the polymerization process. However, sheets formed of other thermoplastic polyolefinic materials such as polypropylenes, polybutenes, polyisoprenes, and copolymers of ethylene and propylene are also suitable. The polyethylene is preferred for the reasons noted, but any of the other polyolefinic sheets can be used so long as it will withstand the conditions encountered during polymerization of the monomer and stretch due to the conditions generated by the polymerization. Such stretching enables the sheet 26 to expand to substantially cover the surface of the plate 18.

The polyethylene sheet 26 should be relatively thin. In practice, for instance, it has been determined that, if the thickness ranges from about 0.00025 to 0.0200 inch, an effective textured surface is produced. In addition, with such a thickness the sheet 26 is easy to remove from the finished cast panel 10. If the sheet 26 is too thin, for example, less than 0.00025 inch, there arises a difficulty in removing such sheet from the textured surface 12, while a sheet that is too thick will not stretch sufficiently.

At the completion of the placement of the polyethylene sheet 26 on the lower glass plate 18, the acrylic monomer material M is injected through material supply line 24 and into the mold cavity 22. Since the basic molding process is standard, the molding assembly is appropriately maintained in a well-known type of oven (not shown) to effectuate the polymerization process of the acrylic monomer M. During this process, the heat causes the thin polyethylene sheet 26 to stretch. Also, an exothermic reaction occurs which gives off heat. This excess heat is exhausted in a known manner by an air circulation system of the oven so as to maintain the polymerization temperature constant through the entire polymerization cycle. In practice, for example, it has been determined that for particularly successful results in obtaining a randomly textured surface with an acrylic monomer, the oven should be maintained at about 125°

F. through the usual time period for the polymerization cycle. At this temperature, polymerization is permitted to occur and the thermoplastic polyethylene sheet 26 can stretch over the lower plate 18.

After the foregoing polymerization cycle has been concluded, the mold cavity 22 is permitted to cool such that the acrylic material M may reach ambient temperature. As a result of the cooling, the polyacrylate casting shrinks and the thin polyethylene sheet 26 distorts and conforms to the uneven cooling of the acrylic material M as the sheet 26 also tends to shrink. As perhaps best shown in FIG. 3, the bottom surface of the solid, self-supporting acrylic panel member 10 is textured in a random fashion so that it includes a multiplicity of irregularly shaped projections and depressions. Such a surface 12 may, for example, be used in those situations wherein a light diffusing decorative polyacrylate panel is desired.

Figure 4:
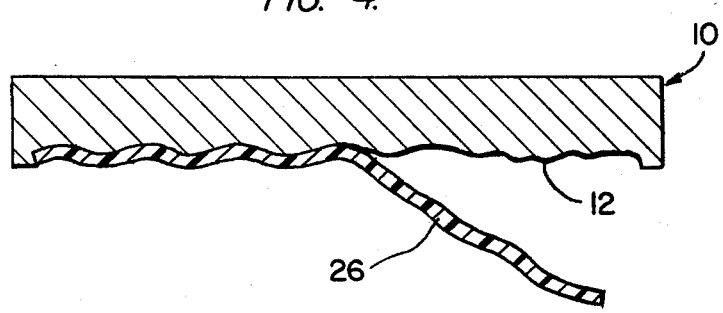
FIG. 4 is a diagrammatic view illustrating the process whereby the distorted thermoplastic sheet is stripped or otherwise removed from the textured surface of the case solid polymerized material.

After the cooling process, the wrinkled polyethylene sheet 26, as is shown in FIG. 4, may be easily stripped from textured surface 12. It will be understood that any conventional and suitable prior art manner may be used to strip the sheet 26 from textured surface 12.

In order to prepare for a subsequent casting which will have a randomly textured surface, it will be appreciated that a new undistorted polyethylene sheet 26 is similarly placed upon either or both of the upper and lower glass plates 16 and 18, respectively. After the aforementioned casting operation is repeated, the resulting finished polyacrylate panel 10 will also have a randomly textured surface 12 which differs from a previously cast acrylic panel. Accordingly, each cast panel 10 will have a textured surface 12 which is different from the others that have been similarly cast.

As can be appreciated from the foregoing description, an extremely simple, reliable, and inexpensive method has been described which provides for the formation of a randomly textured surface having irregularly shaped projections and depressions on a solid, self-supporting casting of a hydrophobic polymerizable plastic monomer material, through a thin strip of thermoplastic material.

While the invention has been described in connection with a preferred embodiment, it is not intended to limit the invention to the particular form set forth, but, on the contrary, it is intended to cover such alternatives, modifications, and equivalents as may be included within the spirit and scope of the invention as defined by the appended claims.

What is claimed is:

1. In the method for forming castings made from a polymerizable hydrophobic monomeric material wherein a liquid hydrophobic polymerizable plastic monomer material is pumped into a cavity, which is defined by a pair of spaced apart smooth surfaces plates that are sealed about the outer perimeter, and polymerized therein under conditions of elevated temperature and thereafter cooled to a solid, self-supporting casting, the improvement comprising the preliminary step of applying a generally flat, undistorted and relatively thin heat stretchable thermoplastic sheet of polyolefinic material having a thickness of about 0.00025 to about 0.02 inch across at least a portion of at least one of the spaced apart smooth surfaces, causing said thermoplastic sheet to stretch when in contact with the liquid polymerizable monomer material during polymerization of said material and during cooling of said polymerized material, shrinking and distorting the sheet differentially relative to said material in random fashion so as to produce a randomly textured surface on at least the corresponding adjacent portion of the polymerized casting.

2. The method as set forth in claim 1 in which the polymerizable monomer material comprises a monomer used to make an acrylic resin.

3. The method as set forth in claim 1, in which the thermoplastic sheet is polyethylene.

4. In a method for forming castings made from a polymerizable hydrophobic material wherein a liquid polymerizable material containing acrylic acid is pumped into a cavity, which is defined by a pair of spaced apart smooth surfaced plates that are sealed about the outer perimeter, and polymerized therein under conditions of elevated temperature and thereafter cooled to a solid, self-supporting casting, the improvement comprising the preliminary step of applying a generally flat, undistorted and relatively thin heat stretchable thermoplastic polyethylene sheet having a thickness of about 0.00025 to 0.0200 inch across at least a portion of at least one of the spaced apart smooth surfaces, stretching said thermoplastic sheet when in contact with the liquid polymerizable material during polymerization of said material and during cooling of said polymerized material, shrinking and distorting the sheet differentially relative to said material in random fashion so as to produce a randomly textured surface on at least the corresponding adjacent portion of the polymerized casting.

5. In a method for forming castings made from a polymerizable hydrophobic material wherein a liquid polymerizable material containing acrylic acid is pumped into a cavity defined by a pair of spaced apart smooth surfaced plates that are sealed about the outer perimeter, and polymerized therein under conditions of elevated temperature and thereafter cooled to a solid, self-supporting casting, the improvement comprising the preliminary step of applying a generally flat, undistorted and relatively thin heat stretchable thermoplastic polyethylene sheet across at least a portion of at least one of the spaced apart smooth surfaces, said sheet having a thickness in the range of about 0.00025 to 0.02 inch; polymerizing the liquid polymerizable material in an oven wherein the temperature of the oven is maintained at about 125° F through the usual time period for polymerization by exhausting excess heat, stretching said thermoplastic sheet when in contact with the liquid polymerizable material during polymerization of said material and differentially shrinking and distorting said sheet in random fashion relative to such material during subsequent cooling to produce upon the removal of said sheet a randomly textured surface on at least the corresponding adjacent portion of the polymerized casting.

* * * * *